US010383033B2

United States Patent
Chang et al.

(10) Patent No.: US 10,383,033 B2
(45) Date of Patent: Aug. 13, 2019

(54) APPARATUS AND METHOD FOR HANDLING NETWORK LOSS IN A WIRELESS COMMUNICATION SYSTEM

(75) Inventors: Young-Bin Chang, Anyang-si (KR); Rakesh Taori, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 433 days.

(21) Appl. No.: 13/279,035

(22) Filed: Oct. 21, 2011

(65) Prior Publication Data
US 2012/0099418 A1 Apr. 26, 2012

(30) Foreign Application Priority Data
Oct. 22, 2010 (KR) .................. 10-2010-0103294

(51) Int. Cl.
| | | |
|---|---|---|
| *H04W 48/06* | (2009.01) | |
| *H04W 36/22* | (2009.01) | |
| *H04W 76/19* | (2018.01) | |

(52) U.S. Cl.
CPC ........... *H04W 48/06* (2013.01); *H04W 36/22* (2013.01); *H04W 76/19* (2018.02)

(58) Field of Classification Search
USPC ................................. 370/216, 221, 328, 331
See application file for complete search history.

(56) References Cited

U.S. PATENT DOCUMENTS

| | | | | |
|---|---|---|---|---|
| 6,690,929 | B1 * | 2/2004 | Yeh ...................... | H04M 15/46 379/114.01 |
| 8,270,353 | B2 * | 9/2012 | Kim et al. ................... | 370/329 |
| 8,494,593 | B2 * | 7/2013 | Black et al. ................. | 455/571 |
| 8,547,969 | B2 * | 10/2013 | Watfa et al. ................. | 370/353 |
| 2003/0195003 | A1 * | 10/2003 | Cao et al. .................... | 455/438 |
| 2006/0035634 | A1 * | 2/2006 | Swann ................. | H04W 48/12 455/425 |
| 2007/0030826 | A1 * | 2/2007 | Zhang et al. ................ | 370/331 |
| 2007/0086388 | A1 * | 4/2007 | Kang et al. .................. | 370/331 |
| 2008/0259905 | A1 * | 10/2008 | Connors ............... | H04W 36/02 370/350 |
| 2009/0129338 | A1 * | 5/2009 | Horn et al. .................. | 370/331 |
| 2009/0149179 | A1 | 6/2009 | Shim et al. | |
| 2009/0213825 | A1 * | 8/2009 | Gupta et al. ................. | 370/338 |
| 2009/0238118 | A1 * | 9/2009 | Steinheider ........... | H04W 92/12 370/328 |
| 2010/0197294 | A1 * | 8/2010 | Fox et al. .................... | 455/422.1 |

(Continued)

FOREIGN PATENT DOCUMENTS

KR 20090061244 6/2009

OTHER PUBLICATIONS

Foreign Communication From a Related Counterpart Application, Korean Application No. 10-2010-0103294, Notice of Final Rejection dated Mar. 3, 2017, 8 pages.

(Continued)

*Primary Examiner* — Robert M Morlan (57) ABSTRACT

An apparatus and method for handling network loss in a wireless access system includes determining whether network loss has occurred or not and, if a Mobile Station (MS) attempts an entry in which the network loss has occurred, transmitting one of a first message including information associated with prohibiting new entry and a second message including information associated with informing that a supported service is restricted.

9 Claims, 11 Drawing Sheets

(56) References Cited

U.S. PATENT DOCUMENTS

| | | | |
|---|---|---|---|
| 2011/0053599 A1* | 3/2011 | Hsu et al. .................... | 455/436 |
| 2011/0081903 A1* | 4/2011 | Cai et al. ..................... | 455/424 |
| 2012/0020293 A1* | 1/2012 | Nix et al. ..................... | 370/328 |
| 2012/0057454 A1* | 3/2012 | Kruglick ....................... | 370/230 |
| 2013/0035033 A1* | 2/2013 | Sanneck et al. ................ | 455/9 |
| 2013/0143574 A1* | 6/2013 | Teyeb et al. ................. | 455/438 |

OTHER PUBLICATIONS

Notice of Preliminary Rejection dated Aug. 16, 2016 in connection with Korean Application No. 10-2010-0103294, 13 pages.
Foreign Communication from a Related Counterpart Application, Korean Patent Application No. 10-2010-0103294; Notice of Patent Grant dated Apr. 24, 2017, 4 pages.

\* cited by examiner

APPARATUS AND METHOD FOR HANDLING NETWORK LOSS IN A WIRELESS COMMUNICATION SYSTEM

CROSS-REFERENCE TO RELATED APPLICATION(S) AND CLAIM OF PRIORITY

The present application is related to and claims the benefit under 35 U.S.C. § 119(a) to a Korean patent application filed in the Korean Intellectual Property Office on Oct. 22, 2010 and assigned Serial No. 10-2010-0103294, the entire disclosure of which is hereby incorporated by reference.

TECHNICAL FIELD OF THE INVENTION

The present invention relates to wireless access systems and more particularly, to an apparatus and method for handling loss in a wireless access system.

BACKGROUND OF THE INVENTION

A wireless access system may provide wireless access to a user using a mobile station (MS). The MS may establish a connection on a wireless channel with a Base Station (BS). The BS connects with an upper node (e.g., a gateway and a core network) through a backhaul network. Accordingly, the MS transmits/receives traffic to/from the core network through the BS.

Generally, a backhaul network used in a communication system is more stable than wireless connection between a BS and a MS. However, in certain cases where network loss occurs in the backhaul network, communication traffic between a core network and the BS may be hampered. So, although the wireless connection may be maintained, a user may still be denied service.

SUMMARY OF THE INVENTION

To address various deficiencies of the prior art, it is a primary aspect of the present invention to provide an apparatus and method for handling network loss in a wireless access system.

Another aspect of the present invention is to provide an apparatus and method for informing a Mobile Station (MS) that entry is prohibited in a wireless access system.

A further aspect of the present invention is to provide an apparatus and method for informing an MS that a supported service is restricted in a wireless access system.

Yet another aspect of the present invention is to provide an apparatus and method for performing a handover to a Base Station (BS) having no network loss in a wireless access system.

The above aspects are achieved by providing an apparatus and method for handling network loss in a wireless access system.

According to one aspect of the present invention, a method for operating a BS in a wireless access system includes determining whether a network loss has occurred or not and, if an MS attempts an entry in which the network loss has occurred, transmitting one of a first message including information associated with prohibiting new entry and a second message including information associated with informing the MS that a supported service is restricted.

According to another aspect of the present invention, a method for operation of an MS in a wireless access system includes identifying if a first message including information associated with prohibiting new entry is received when attempting network entry to a first BS and, if the first message is received, stopping the network entry to the first BS, and attempting network entry to a different BS.

According to a further aspect of the present invention, a BS apparatus in a wireless access system includes a controller and a modulator/demodulator (modem). The controller is configured to determine whether network loss has occurred or not. If an MS attempts an entry in which the network loss has occurred, the modem is configured to transmit one of a first message including information associated with prohibiting new entry and a second message including information associated with informing that a supported service is restricted.

According to yet another aspect of the present invention, an MS apparatus in a wireless access system includes a modem and a controller. When attempting network entry to a first BS, the modem is configured to identify if a first message including information associated with prohibiting new entry is received. If the first message is received, the controller stops the network entry to the first BS, and attempts network entry to a different BS.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system Below, exemplary embodiments of the present invention provide a technology for recognizing network loss and handling network loss in a wireless access system.

Figure 1:
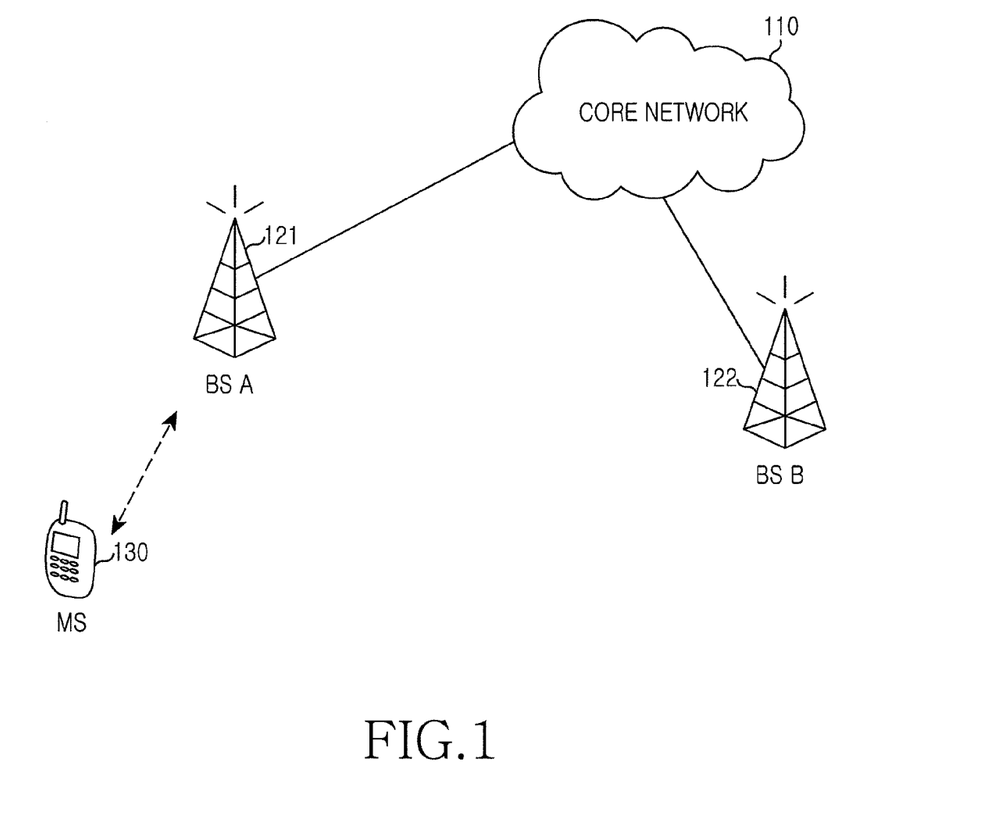
FIG. 1 illustrates an example schematic structure of a wireless access system according to one embodiment of the present invention.

FIG. 1 illustrates an example schematic structure of a wireless access system according to an embodiment of the present invention.

Referring to FIG. 1, the wireless access system includes a core network 110, a Base Station (BS) A 121, a BS B 122, and an MS 130. For convenience of description, only two BSs and one MS are illustrated in FIG. 1, but a large number of BSs and MSs may be included.

The core network 110, a wired network in which traffic is forwarded, can include servers and other devices that provide service. For example, the core network 110 can be an Internet Protocol (IP) network. The BS A 121 and the BS B 122, equipment providing wireless access of the MS 130, have a coverage area of a relatively constant geographic extent and provide wireless access to an MS located within their respective coverage areas. The MS 130, a device communicating with a BS, becomes a starting point or end point of data transmission and performs communication with the BS A 121 and the BS B 122 through a wireless channel.

The BS A 121 and the BS B 122 can determine if connection with the core network 110 is normal using a specific message defined in the wireless access system or a connection identification program used in an upper layer of a protocol stack used to facilitate the communication. For example, the specific message defined in the wireless access system can be an Access Service Network GateWay (ASN-GW) ALIVE message defined in a Worldwide interoperability for Microwave Access Network Working Group (Wi-MAX NWG). Further, the connection identification program used in the upper layer can be a ping program defined in a Transmission Control Protocol/Internet Protocol (TCP/IP).

If partial or full network loss is recognized using the specific message or specific program, the BS A 121 and the BS B 122 may handle the network loss as follows.

According to one embodiment of the present invention, the BS A 121 and the BS B 122 cease managing the affected MS. That is, service to the MS is halted within the coverage area of the BS A 121 and the BS B 122.

According to another embodiment of the present invention, the BS A 121 and the BS B 122 forward a message indicating prohibited entry of an MS, and control an MS serviced by the BS A 121 and the BS B 122 to perform a handover to a different BS. Further, the BS A 121 and the BS B 122 may control an MS intending to perform a to a BS that is not the BS A 121 or the BS B 122.

In one embodiment, the message indicating prohibited entry is called a 'non-available service message' in the present invention. In another embodiment, the 'non-available service message' can have not only a form of a message but also a form of a header or one or more Information Elements (IE) included in a message. The 'non-available service message' may be broadcasted, or multicasted to a specific group, or unicasted to one MS.

According to an embodiment of the present invention, the 'non-available service message' can include the following information. That is, the 'non-available service message' can include at least one of a 'service non-available indicator' and a 'service available indicator'. The 'service non-available indicator' indicates that a corresponding BS is denied service. The 'service available indicator' indicates that the BS is capable of providing service. For example, where the 'service available indicator' is equal to '0' or the 'service non-available indicator' is equal to '1', an MS receiving the 'non-available service message' does not perform network entry or handover to a BS transmitting the 'non-available service message.' In contrast, where the 'service available indicator' is equal to '1' or the 'service non-available indicator' is equal to '0', the MS receiving the 'non-available service message' can perform normal network entry or handover to the BS transmitting the 'non-available service message.' Further, in a case of an MS is serviced by a particular BS, the 'non-available service message' can be included in a handover message to force the MS to perform a handover to a different BS.

According to another embodiment of the present invention, in case of a partial network loss, the BS A 121 and the BS B 122 maintain communication with an MS, but permit only a restricted Quality of Service (QoS) service. In order to permit only the restricted QoS service, the BS A 121 and the BS B 122 can provide information on an available QoS service or information on a non-available QoS service. For example, in a case where a forward time of a packet from a BS to a core network gets longer because of partial network loss, a real-time service may not be permitted using the BS. In this example, the BS A 121 and the BS B 122 may forward a message informing that a supported service is restricted, thereby obstructing network entry or handover of an MS requiring the real-time service and, therefore, is able to allow the MS to perform handover to a different BS. Further, the BS A 121 and the BS B 122 may control an MS using a non-permitted service among multiple MSs that are accessible to the BS A 121 or the BS B 122 to perform handover to a different BS. The message informing that the supported service is restricted can include a service flow Identifier (ID) or connection ID (i.e., flow ID) included in a list of a supportable service class or a predefined list, or can include a service flow ID or connection ID included in a list of a non-supportable service class or a predefined list, or can include a supportable concrete QoS parameter (e.g., a data rate having a maximum or minimum value, a delay time, a jitter, a data priority (i.e., a traffic priority), the type (i.e., best effort, real-time, and non-real time) of supportable scheduling, a resource allocation period and interval, retransmission or non-retransmission, and the like). In one embodiment, the 'message of informing that the supported service is restricted' is called an 'available QoS service message.' In other embodiments, the 'available QoS service message' can have a form of a header not a form of a message or one IE included in a message. The available QoS service message may be broadcasted, or multicasted to a specific group, or unicasted to one MS.

A way using the 'non-available service message' may be used in cases where service provision is hampered due to network loss. This way of using the available QoS service message may be desirable for cases where network loss exists, but a traffic communication of a restricted QoS condition may still be possible. Further, this manner of using the 'non-available service message' can be executed according to a long period, and the manner of using the available 'QoS service message' can be executed according to a short period. In other words, upon a first network loss occurrence, the manner of using the 'available QoS service message' can be first executed and then be replaced by the 'non-available service message' depending on a degree of the subsequent network loss. For example, the decision may be based upon how long a network loss exists, if a network loss level exceeds a specified threshold value, and the like.

Described below are detailed operations of a BS and an MS according to respective embodiments of the present invention.

Figure 2A:
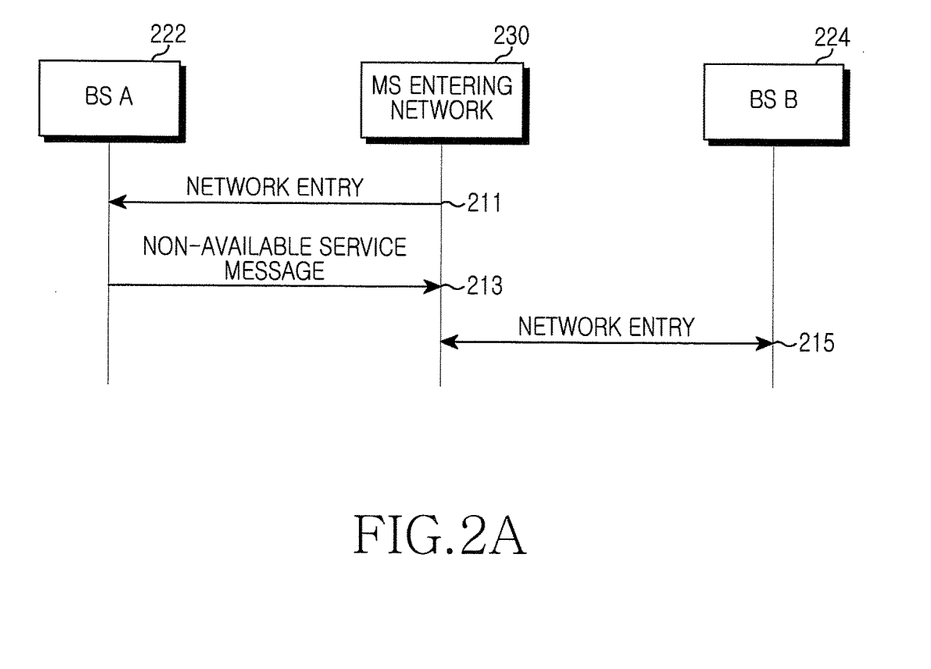
FIGS. 2A to 2C illustrate example ladder diagrams depicting a signal exchange for network loss incurred in a wireless access system according to an embodiment of the present invention.
Figure 2B:
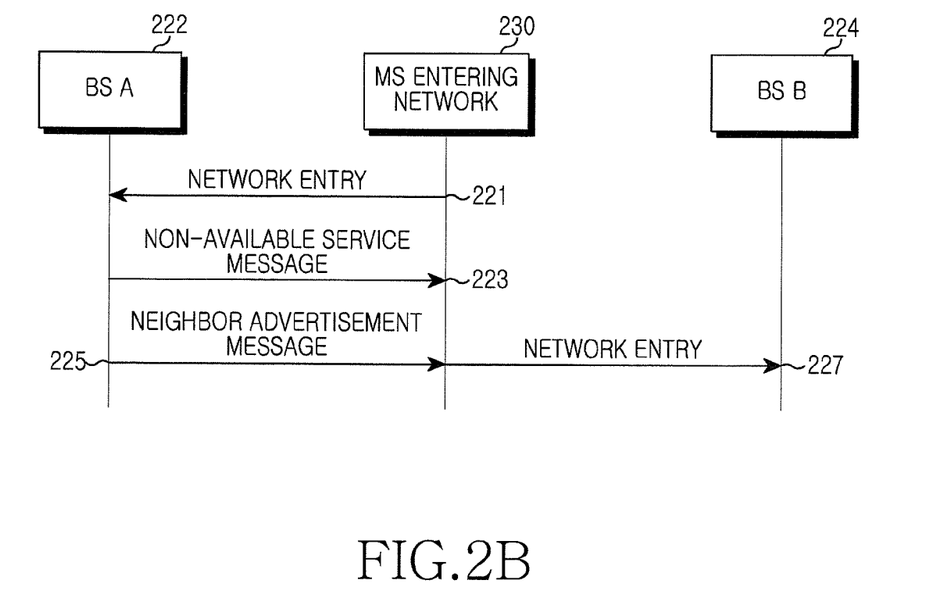
Figure 2C:
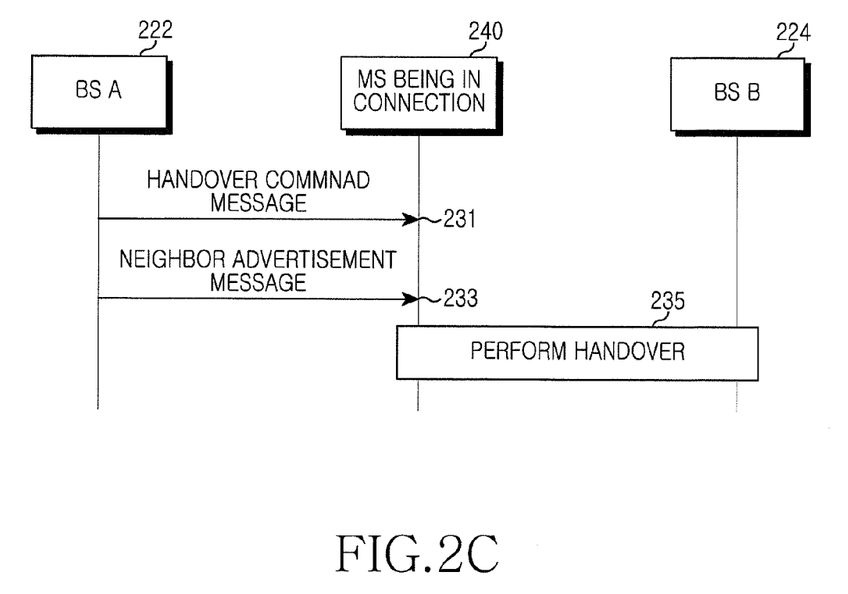

FIGS. 2A to 2C illustrate a signal exchange for network loss in a wireless access system according to one embodiment of the present invention. FIGS. 2A to 2C illustrate operations of an MS and a BS according to the manner of using the non-available service message. In a description of FIGS. 2A to 2C, it is assumed that a BS A 222 is capable of recognizing network loss.

FIG. 2A illustrates a particular case where an MS attempts a new entry after recognizing a backhaul network loss condition. Referring to FIG. 2A, an MS 230 attempts network entry to a BS A 222 (step 211). In response, the BS A 222 suffering backhaul network loss transmits a 'non-available service message' to the MS 230 (step 213). According to an embodiment of the present invention, the 'non-available service message' can be unicasted to the MS 230 that is attempting the network entry. According to another embodiment of the present invention, the 'non-available service message' can be broadcasted. The MS 230 receiving the 'non-available service message' determines that the MS 230 cannot enter the BS A 222 and thus, attempts network entry to the BS B 224 (step 215). At this time, if a backhaul network of the BS B 224 is in a normal state, the MS 230 can successfully perform the network entry to the BS B 224.

FIG. 2B illustrates a particular case where an MS attempts a new entry after recognizing a backhaul network loss condition. Referring to FIG. 2B, an MS 230 attempts network entry to a BS A 222 (step 221). In response, the BS A 222 suffering backhaul network loss transmits a 'non-available service message' to the MS 230 (step 223). According to an embodiment of the present invention, the 'non-available service message' can be unicasted to the MS 230 attempting the network entry. Or, according to another embodiment of the present invention, the 'non-available service message' can be broadcasted. Next, the BS A 222 transmits to the MS 230, a neighbor advertisement message including information on neighboring BSs (step 225). The neighbor advertisement message can be unicasted or broadcasted. The MS 230 receiving the 'non-available service message' determines that it cannot enter the BS A 222, acquires information on a BS B 224 through the neighbor advertisement message, and then attempts network entry to the BS B 224 (step 227). At this time, if a backhaul network of the BS B 224 is in a normal state, the MS 230 can successfully perform the network entry to the BS B 224.

FIG. 2C illustrates an example embodiment of how an MS may handle a connection after recognizing a backhaul network loss condition. Referring to FIG. 2C, a BS A 222 transmits a handover command message to a connected MS 240 (step 231). The handover command message can be unicasted. However, in cases where multiple MSs are connected, the handover command message can be broadcasted or multicasted to simultaneously instruct handover to the multiple MSs. Further, the BS A 222 transmits to the MS 240, a neighbor advertisement message to provide information on neighboring BSs to the MS 240 (step 233). The neighbor advertisement message can be unicasted or broadcasted. In response, the MS 240 may perform a handover procedure to a BS B 224 (step 235). At this time, if a backhaul network of the BS B 224 is in a normal state, the MS 240 can successfully perform a handover to the BS B 224.

FIGS. 3A to 3E illustrate an example signal exchange procedure for network loss in a wireless access system according to another embodiment of the present invention. FIGS. 3A to 3E illustrate operations of an MS and a BS according to the way using the available 'QoS service message.' In a description of FIGS. 3A to 3E, it is assumed that a BS A 322 is capable of recognizing network loss.

Figure 3A:
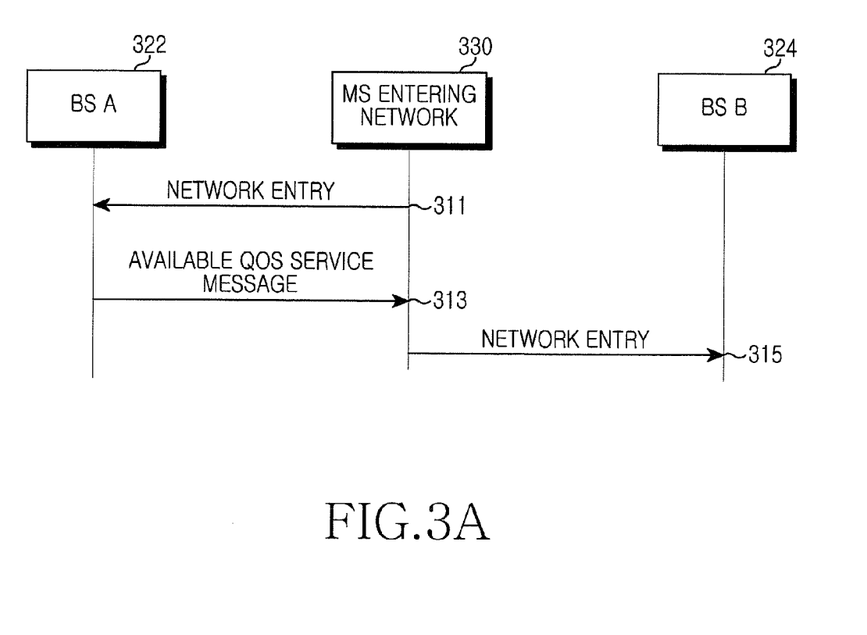
FIGS. 3A to 3E illustrate ladder diagrams depicting a signal exchange for network loss incurred in a wireless access system according to another embodiment of the present invention.

FIG. 3A illustrates a case where an MS attempts a new entry after backhaul network loss recognition. Referring to FIG. 3A, an MS 330 attempts network entry to a BS A 322 (step 311). In response, the BS A 322 suffering backhaul network loss transmits an available 'QoS service message' to the MS 330 (step 313). According to one embodiment, the available 'QoS service message' can be unicasted to the MS 330 attempting the network entry. However, according to another embodiment, the available 'QoS service message' can be broadcasted. The MS 330 receiving the available 'QoS service message' recognizes that the BS A 322 can provide only a restricted service, and determines if a service desired by the MS 330 is supported. If the MS 330 determines that the desired service is not supported, the MS 330 attempts network entry to a BS B 324 (step 315). At this time, if a backhaul network of the BS B 324 is in a normal state, the MS 330 can successfully perform the network entry to the BS B 324.

Figure 3B:
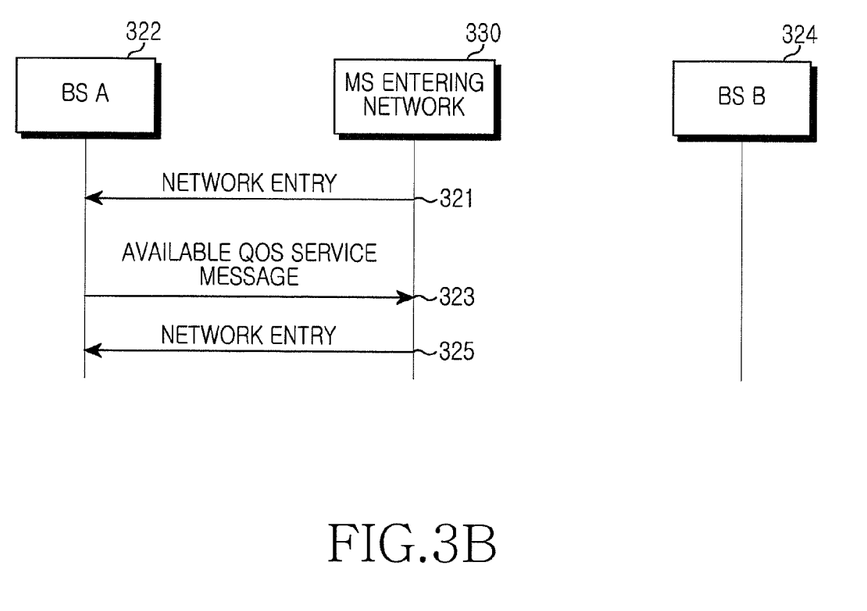

FIG. 3B illustrates an example method where an MS attempts a new entry after recognizing a backhaul network loss condition. Referring to FIG. 3B, an MS 330 attempts network entry to a BS A 322 (step 321). In response, the BS A 322 suffering backhaul network loss transmits an available 'QoS service message' to the MS 330 (step 323). According to oneembodiment, the available 'QoS service message' can be unicasted to the MS 330 attempting the network entry. However, according to another embodiment, the available 'QoS service message' can be broadcasted. The MS 330 receiving the available 'QoS service message' recognizes that the BS A 322 can provide only a restricted service, and determines if a service desired by the MS 330 is supported. If the MS 330 determines that the desired service is supported as the determination result, the MS 330 sustains a network entry procedure to the BS A 322 (step 325).

Figure 3C:
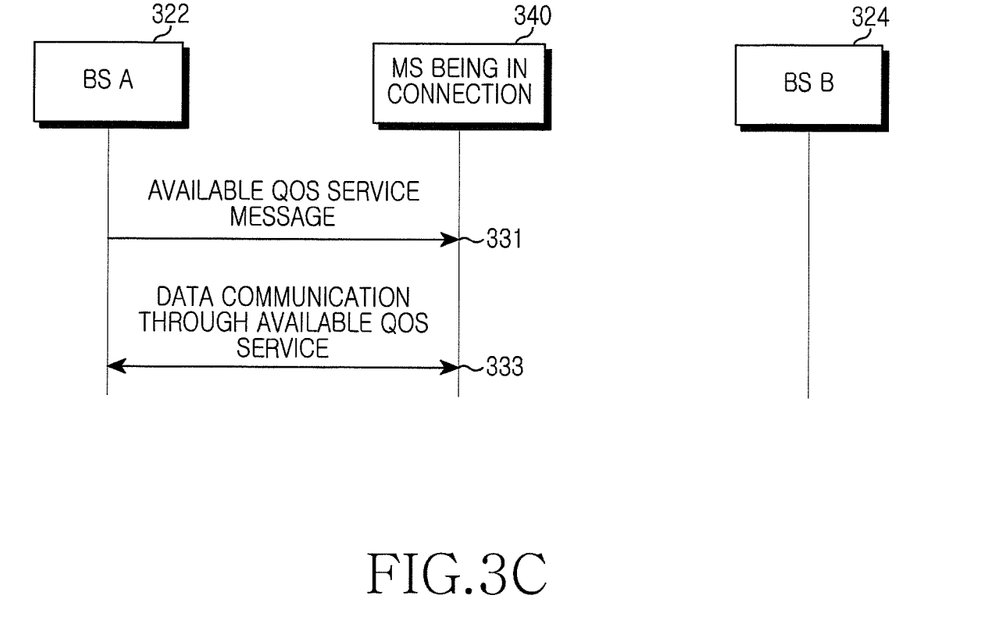

FIG. 3C illustrates an example method for handling a MS having an active connection when recognizing a backhaul network loss condition. Referring to FIG. 3C, a BS A 322 transmits an available 'QoS service message' to an MS 340 having an active connection (step 331). Here, the available 'QoS service message' can be unicasted. In another case where multiple MSs are connected, the available 'QoS service message' can be broadcasted or multicasted to inform the multiple MSs of the type of a simultaneously supportable service. Accordingly, the MS 340 recognizes that the BS A 322 can provide only a restricted service, and determines if a service desired by the MS 340 is supported.

If the MS 340 determines that the desired service is supported, the MS 340 sustains data communication through a QoS service supportable in the BS A 322 (step 333).

Figure 3D:
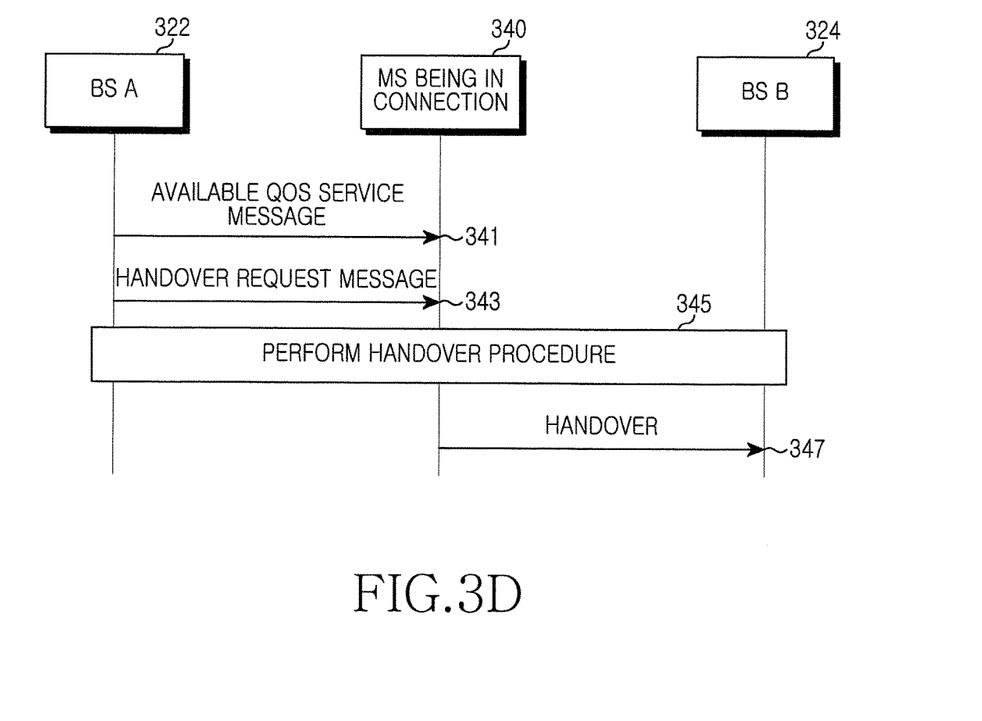

FIG. 3D illustrates an example method for handling an MS having a connection when recognizing a backhaul network loss condition. Referring to FIG. 3D, a BS A 322 transmits an available 'QoS service message' to an MS 340 having an active connection (step 341). The available 'QoS service message' can be unicasted. However, in a case having multiple MSs, the available 'QoS service message' can be broadcasted or multicasted to inform the multiple MSs of the type of simultaneously supportable service. Accordingly, the MS 340 recognizes that the BS A 322 can provide only a restricted service, and determines if a service desired by the MS 340 is supported. If the MS 340 determines that the desired service is not supported, the MS 340 transmits a handover request message to the BS A 322 (step 343). Next, the MS 340 performs a handover procedure with a BS B 324 (step 345) and, thereafter completes handover to the BS B 324 (step 347).

Figure 3E:
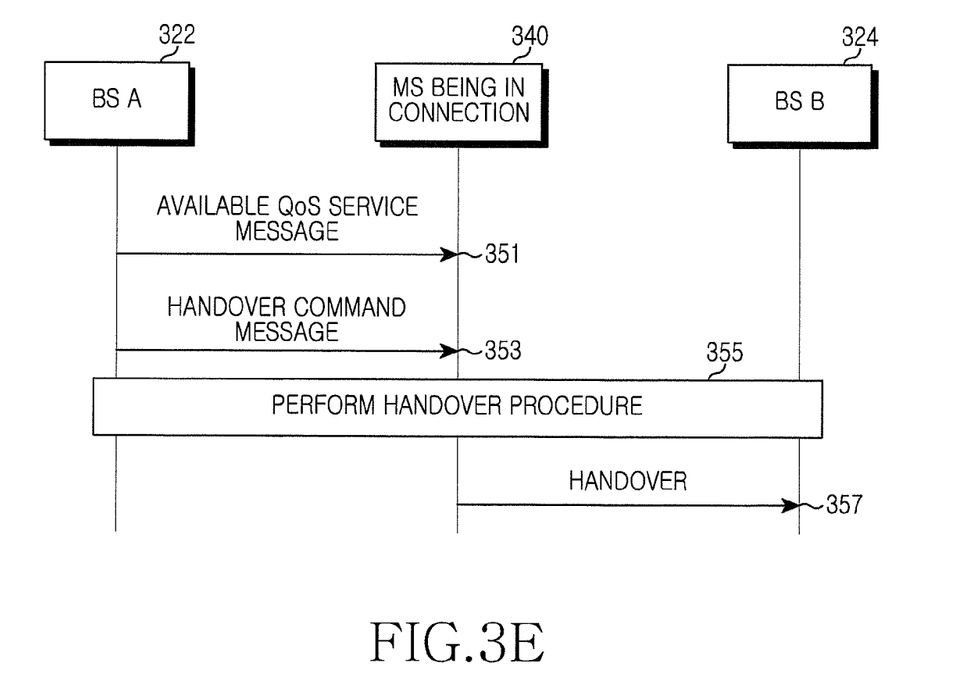

FIG. 3E illustrates an example method for handling an MS having an active connection when recognizing a backhaul network loss condition. Referring to FIG. 3E, a BS A 322 transmits an available 'QoS service message' to an MS 340 having an active connection (step 351). The available 'QoS service message' can be unicasted. However, in a case where there are multiple MSs, the available 'QoS service message' can be broadcasted or multicasted so as to inform the multiple MSs of the type of a simultaneously supportable service. At this time, because the MS 340 is provided with a service through the BS A 322, the BS A 322 can know if the MS 340 is using what type of service and further, can determine if it can support a service that the MS 340 is using. If the BS A 322 determines that it cannot support the service that the MS 340 is using as the determined result, the BS A 322 transmits a handover command message to the MS 340 (step 353). In response, the MS 340 performs a handover procedure with a BS B 324 (step 355) and, thereafter completes handover to the BS B 324 (step 357).

Figure 4:
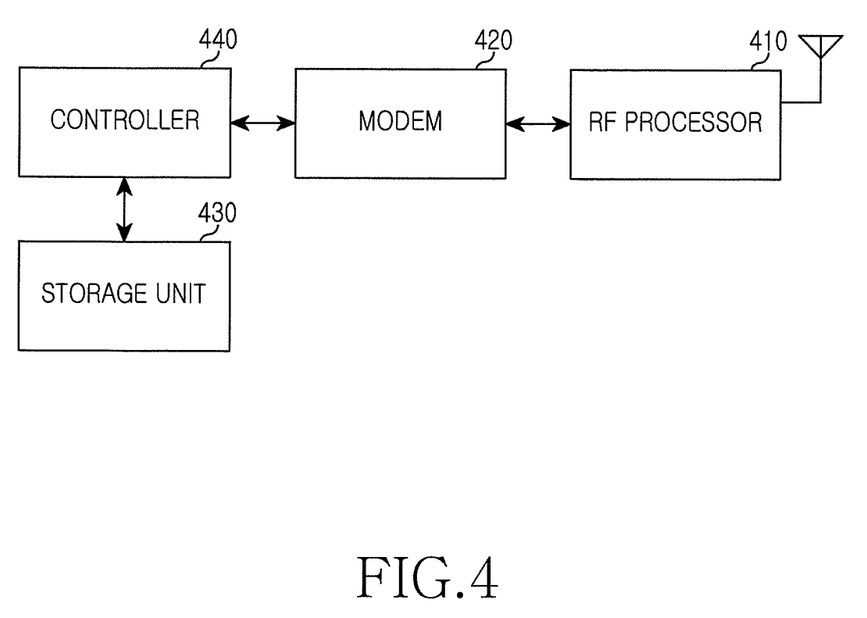
FIG. 4 illustrates an example construction of a Mobile Station (MS) in a wireless access system according to an embodiment of the present invention.

FIG. 4 illustrates an example MS that may be used in a wireless access system according to an embodiment of the present invention.

As illustrated in FIG. 4, the MS includes an RF processor 410, a modulator/demodulator (modem) 420, a storage unit 430, and a controller 440. The RF processor 410 transmits and/or receives a signal through a wireless channel, which may include, for example, signal band conversion, amplification of the signal, and the like. That is, the RF processor 410 may up-convert a baseband signal provided from the modem 420 into an RF band signal, transmit the RF band signal through an antenna, and down-convert an RF band signal received through the antenna into a baseband signal.

The modem 420 converts a signal between a baseband signal and a bit stream. For example, according to an Orthogonal Frequency Division Multiplexing/Orthogonal Frequency Division Multiple Access (OFDM/OFDMA) scheme, the modem 420 may generate complex symbols by encoding and modulating a transmit bit stream, map the complex symbols to subcarriers, and then configure OFDM symbols through an Inverse Fast Fourier Transform (IFFT) operation and a Cyclic Prefix (CP) insertion operation. Further, at data reception, the modem 420 may divide a baseband signal provided from the RF processor 410 in an OFDM symbol unit, restore signals mapped to subcarriers through Fast Fourier Transform (FFT) operation, and then restore a reception bit stream through demodulation and decoding.

The storage unit 430 stores instructions of a executable program for operating the MS, an application program, user contents, system information, setting information, and the like. And, the storage unit 430 provides the stored data according to a request of the controller 440.

The controller 440 controls the operation of the MS. For example, the controller 440 may generate a transmission traffic packet and message, provide the same to the modem 420, and analyze a reception traffic packet and message provided from the modem 420. Particularly, the controller 440 may receive a message transmitted by a BS according to network loss, and control a function corresponding to the message. For instance, the controller 440 may control the MS to operate like MSs 230, 240, 330, and 340 of FIGS. 2A to 2C and FIGS. 3A to 3E.

According to certain embodiments of the present invention, the controller 440 may identify if a 'non-available service message' is received when attempting network entry to a BS. If the 'non-available service message' is received, the controller 440 may recognize that the BS is suffering network loss, and stop network entry to the BS. After that, the controller 440 can attempt network entry to a different BS. At this time, if a 'neighbor advertisement message' is received following the 'non-available service message,' the controller 440 can attempt network entry to a different BS with reference to information of the different BS included in the 'neighbor advertisement message.'

According to another embodiment, if a 'handover command message' is received from a BS having an active connection with an MS, the controller 40 may control the MS to perform a handover to a different BS instructed by the 'handover command message.'

According to another embodiment, the controller 440 may identify if an available 'QoS service message' is received when attempting network entry. If the available 'QoS service message' is received, the controller 440 may recognize that the BS is suffering partial network loss, identify the type of a service supportable in the BS, and determines if a service intended for provision is supported. If the service intended for provision is supported, the controller 440 may sustain a procedure of entry to the BS and, if the service intended for provision is not supported, the controller 440 stops the procedure of entry to the BS.

Further, according to another embodiment, if an available 'QoS service message' is received from a BS having an active connection with an MS, the controller 440 may recognize that the BS is suffering partial network loss, identify the type of a service that is supported in the BS, and then determine if a currently provided service is supported. If the service is supported, the controller 440 may continue communication with the BS. If the service is not supported, the controller 440 may transmit a handover request message to the BS and then, perform handover to a different BS. If a handover command message is received following the available 'QoS service message,' the controller 440 may control the MS to perform a handover to a different BS instructed by the handover command message.

Figure 5:
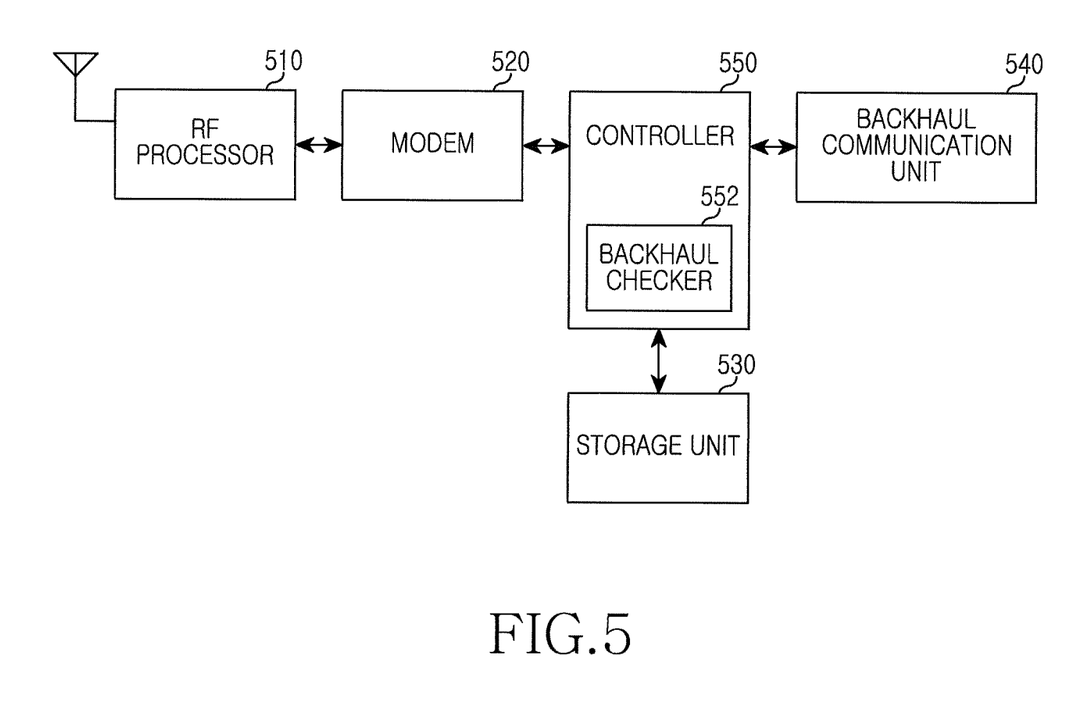
FIG. 5 illustrates an example construction of a Base Station (BS) in a wireless access system according to an embodiment of the present invention.

FIG. 5 illustrates an example BS that may be used in a wireless access system according to an embodiment of the present invention.

As illustrated in FIG. 5, the MS includes an RF processor 510, a modem 520, a storage unit 530, a backhaul communication unit 540, and a controller 550. The RF processor 510 transmits and receives a signal through a wireless channel, which may include, for example, signal band conversion, amplification of the signal, and the like. That is, the RF processor 510 may up-convert a baseband signal provided from the modem 520 into an RF band signal, transmit the RF band signal through an antenna, and down-convert an RF band signal received through the antenna into a baseband signal.

The modem 520 converts the signal between a baseband signal and a bit stream. For example, according to an OFDM/OFDMA scheme, the modem 520 may generate complex symbols by encoding and modulating a transmit bit stream, map the complex symbols to subcarriers, and then configure OFDM symbols through an IFFT operation and a CP insertion operation. Further, upon data reception, the modem 520 may divide a baseband signal provided from the RF processor 510 in an OFDM symbol unit, restore signals mapped to subcarriers through FFT operation, and then restore a reception bit stream through demodulation and decoding.

The storage unit 530 stores instructions of an executable program for operating of the BS, an application program, user content, system information, setting information, and the like. The storage unit 530 may also provide the stored data according to a request of the controller 550.

The backhaul communication unit 540 provides an interface for the BS to perform communication with an upper node or other communication device in a core network. That is, the backhaul communication unit 540 converts a bit stream transmitted from the BS to the upper node or the core network into a physical signal, and converts a physical signal received from the upper node or the core network into a bit stream.

The controller 550 controls various functions of the BS. For example, the controller 550 may generate a transmission traffic packet and message, provide the same to the modem 520, and analyze a reception traffic packet and message provided from the modem 520. Particularly, the controller 550 may include a backhaul checker 552 for determining a network loss condition. The backhaul checker 552 determines if a connection with a core network is normal using a specific message defined within a wireless access system or a connection identification program used in an upper layer. For example, the backhaul checker 552 may determine the network loss exists or not according to a predefined period. That is, the backhaul checker 552 may transmit a specified message to a core network side and, through reception or non-reception of a response to the message, determine a network loss condition exists or not. For instance, the backhaul checker 552 may determine the network loss condition using an ASN-GW ALIVE message or a ping algorithm. If the network loss is recognized by the backhaul checker 552, the controller 550 may generate and transmit a specified message according to the network loss, and perform procedure for handling an MS entering the network and an MS having an active connection. For instance, the controller 550 controls the BS to operate like the BS A 222 or 322 of FIGS. 2A to 2C or FIGS. 3A to 3E.

According to an embodiment of the present invention, if a network loss occurs, the controller 550 may halt entry or handover of an MS that newly enters and an MS having an active connection using a 'non-available service message' or an available 'QoS service message.' In other embodiments, the controller 550 can directly instruct the MS being in connection to perform a handover using a 'handover command message.'

The following describes a particular case where the 'non-available service message' may be used. Upon network loss, if an MS attempts entry, the controller 550 may inform the MS that service is prohibited by transmitting to the MS, the 'non-available service message.' The 'non-available service message' can be unicasted or broadcasted. Further, the controller 550 may transmit a handover command message to an MS having an active connection, thereby allowing the MS having the active to perform a handover to a different BS. Here, the 'handover command message' can be unicasted, multicasted, or broadcasted. At this time, the controller 550 can transmit a 'neighbor advertisement message' following the 'non-available service message' or the 'handover command message.'

The following describes a particular case where the available 'QoS service message' is used. Upon network loss, if an MS attempts entry, the controller 550 informs the MS of a currently supportable service by transmitting to the MS, the available 'QoS service message.' Further, the controller 550 may transmit an available 'QoS service message' to an MS having an active connection to inform the MS of a currently supportable service. The available 'QoS service message' can be unicasted or broadcasted. Additionally, the controller 550 may determine if a service that the MS is using is supportable and, in a case where it is not supportable, the controller 550 can transmit to the MS, a handover command message.

In the aforedescribed embodiment, the 'non-available service message' and the available 'QoS service message' may be used in cases of a full network loss,\ a case of partial network loss, or can be a constant time interval from first network loss, a subsequent time interval, or can be before or after timing at which a degree of network loss after first network loss occurrence exceeds a specified criterion.

As described above, exemplary embodiments of the present invention can minimize the disruption of communication due to network loss, by prohibiting entry of an MS using a message that includes prohibiting new entry at network loss occurrence or a message that includes information that a supported service is restricted, and making an MS having an active connection perform a handover in a wireless access system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for operating a base station (BS) in a wireless access system, the method comprising:
  detecting a backhaul network loss;
  transmitting a first message informing that a supported service is restricted to a first terminal connected to the BS, in response to the detecting the backhaul network loss;
  receiving, from a second terminal, a second message to request a network entry;
  determining whether the BS operates in a state of a partial backhaul network loss or in a state of a full backhaul network loss;
  in response to determining that the BS operates in the state of the partial backhaul network loss:
    determining whether an elapsed time from the partial backhaul network loss is less or greater than a predetermined period,
    if the elapsed time is less than the predetermined period, transmitting, to the second terminal, a third message including information of available quality of service (QoS) over a unicast downlink channel, and receiving, from the second terminal, a fourth message to continue the network entry, when a type of service requested by the second terminal is supported by the available QoS indicated in the second message, and if the elapsed time is greater than the predetermined period, transmitting a fifth message informing that the network entry is prohibited, and transmitting an instruction to perform a handover to one of neighbor BSs; and in response to determining that the BS operates in the state of the full backhaul network loss:

transmitting the fifth message informing that the network entry is prohibited, transmitting a sixth message including information of neighbor BSs; and transmitting an instruction to perform a handover to one of neighbor BSs.

2. The method of claim 1, further comprising:
after transmitting the first message, when a service being currently provided to the first terminal is not supported, transmitting, to the first terminal connected to the BS, an instruction to perform a handover to one of BSs indicated in the information of neighbor BSs.

3. A base station (BS) in a wireless access system, the BS comprising:
a transceiver; and
at least one processor coupled to the transceiver and configured to:
detect a backhaul network loss;
transmit a first message informing that a supported service is restricted to a first terminal connected to the BS, in response to detecting the backhaul network loss;
receive, from a terminal, a second message to request a network entry;
determine whether the BS operates in a backhaul network loss comprising at least one of a state of a partial backhaul network loss or a full backhaul network loss;
in response to determining that the BS operates in the state of the partial backhaul network loss:
determine whether an elapsed time from the partial backhaul network loss is less or greater than a predetermined period,
if the elapsed time is less than the predetermined period, transmit, to a second terminal, a third message including information of available quality of service (QoS) over a unicast downlink channel, and receive, from the second terminal, a fourth message to continue the network entry, when a type of service requested by the second terminal is supported by the available QoS indicated in the second message, and if the elapsed time is greater than the predetermined period, transmit a fifth message informing that the network entry is prohibited; and in response to determining that the BS operates in the state of the full backhaul network loss:
transmit the fifth message informing that the network entry is prohibited, and
transmit a sixth message including information of neighbor BSs.

4. The BS of claim 3, wherein the at least one processor is further configured to, after transmitting the first message, when a service being currently provided to the first terminal is not supported, transmit, to the first terminal connected to the BS, an instruction to perform a handover to one of BSs indicated in the information of neighbor BSs.

5. The method of claim 1, wherein the third message comprises at least one of information of at least one non-available service class, information of at least one available service class, or information of an available scheduling type, and wherein the information of the at least one available service class comprises at least one of a data rate including a maximum or minimum value, a delay time, a jitter, a data priority, or a traffic priority.

6. The method of claim 1, wherein the detecting a backhaul network loss comprises:
detecting the backhaul network loss by using a message defined in the wireless access system,
wherein a specific message comprises an access service network gateway (ASN-GW) ALIVE message.

7. The method of claim 1, wherein the detecting a backhaul network loss comprises detecting the backhaul network loss by using a connection identification program, and wherein the connection identification program comprises a ping program defined in a transmission control protocol/internet protocol (TCP/IP).

8. The method of claim 1, wherein the fifth message includes 1-bit indicator informing whether services are available or not.

9. The method of claim 1, wherein the third message includes at least one supportable service class, or supportable QoS parameters.

* * * * *